(12) United States Patent
Weston et al.

(10) Patent No.: US 9,405,425 B1
(45) Date of Patent: Aug. 2, 2016

(54) SWAPPABLE CONTENT ITEMS

(71) Applicant: Google Inc., Mountain View, CA (US)

(72) Inventors: Daniel D. Weston, Valencia, CA (US);
Charles La, Santa Monica, CA (US);
Jonathan Wolfe, Pasadena, CA (US);
Paul Schelte Reitsma, Marina del Rey, CA (US); James D. Hawkins, Hawthorne, CA (US); Mehdi Sharifzadeh, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 670 days.

(21) Appl. No.: 13/754,587

(22) Filed: Jan. 30, 2013

(51) Int. Cl.
G06Q 30/00 (2012.01)
G06F 3/048 (2013.01)

(52) U.S. Cl.
CPC ..................................... *G06F 3/048* (2013.01)

(58) Field of Classification Search
None
See application file for complete search history.

(56) References Cited

U.S. PATENT DOCUMENTS

| | | | |
|---|---|---|---|
| 2004/0003351 A1* | 1/2004 | Sommerer | G06F 17/30876 715/251 |
| 2005/0066366 A1* | 3/2005 | Takamine | H04N 5/44591 725/59 |
| 2005/0096980 A1* | 5/2005 | Koningstein | G06Q 30/00 705/14.41 |
| 2012/0158521 A1* | 6/2012 | McCullen | G06Q 30/0273 705/14.69 |
| 2014/0181699 A1* | 6/2014 | Godsey | G06F 17/30873 715/760 |

OTHER PUBLICATIONS

Wikipedia.com, "Picture-in-picture," retrieved on Jan. 27, 2014. Retrieved from the internet: URL<http://en.wikipedia.org/wiki/Picture-in-picture>. 3 pages.
Wikipedia.com, "Call waiting," retrieved on Jan. 27, 2014. Retrieved from the internet: URL <http://en.wikipedia.org/wiki/Call_waiting>. 3 pages.
Wikipedia.com, "Meebo," retrived on Jan. 27, 2014. Retrieved from the internet: URL <https://web.archive.org/web/20111213044412/http:/en.wikipedia.org/wiki/Meebo>. 7 pages.
Chin, Courtney, "Introducing expandable ads on AdSense sites," Mar. 4, 2009, [retrieved on Jan. 27, 2014]. Retrieved from the Internet: URL <http://adsense.blogspot.com/2009/03/introducing-expandable-ads-on-adsense.html>. 3 pages.

* cited by examiner

*Primary Examiner* — Asher Kells
(74) *Attorney, Agent, or Firm* — Foley & Lardner LLP; John D. Lanza

(57) ABSTRACT

Methods, systems, and apparatus, including computer programs encoded on a computer-readable storage medium, for presenting content associated with a landing page. A method includes: receiving a request for content to be published along with third party content in a resource; identifying a content item responsive to the request, the content item including a link to a landing page and an indicator for designating the content item as a swappable content item, wherein a swappable content item enables navigation away from the resource to the landing page without losing state of the resource, the content item being configured to monitor interactions of the user and inhibit a direct loading of a landing page in favor of a simultaneous presentation of the content of the landing page in a container having an overlay that includes the resource; and providing the content item including the indicator responsive to the request.

32 Claims, 10 Drawing Sheets

```
div.cts_pub { transition: all 0.5s linear; z-index: 0; }                                              ⌐ 502
div.cts_pub_swapped { transition: all 0.8s linear; z-index: 10;                                        ⌐ 504
    transform: translate(80%,2%) scale(0.18); overflow: hidden; }
div.cts_adv { transition: all 0.5s linear; z-index: 0; opacity: 0; }                                   ⌐ 506
div.cts_adv_swapped { transition: all 0.5s linear; z-index: 0; opacity: 1; }                           ⌐ 508
div.cts_pub_overlay { position: fixed; z-index: -1; opacity: 0.5; display: none; }                     ⌐ 510
div.cts_pub_overlay_swapped { position: fixed; z-index: 100; opacity: 0.5; display: block; }           ⌐ 512
```

FIG. 5A

```
<BODY>
<DIV>                  ╭─552
<DIV class="cts_adv{_swapped}">
<IFRAME src="onclick:LANDING_PAGE_URL">
<DIV class="cts_adv_overlay" [fires onclick/onmouseout/
onmouseover]
style="margin-top: HEIGHT; height: HEIGHT; width: width:
WIDTH">
<DIV class="cts_marker">
<DIV style="float:right; height:16px; …">
<IMG src="click_to_swap_icon.png">
</DIV>
<DIV class="onmouseout:cts_label{onmouseover:_expanded}">
<IMG src="click_to_swap_label.png" height="20px" width="1px">
</DIV>
</DIV>
</DIV>
</DIV>                 ╭─554
<DIV class="cts_pub{_swapped}">
<DIV class="cts_pub_overlay{_swapped}">
<DIV class="center">
<IMG class="cts_back{_magnified}"
src="click_to_swap_back.png">
</DIV>
</DIV>
<!-- EXISTING PUBLISHER PAGE GOES HERE -->
</DIV>
</DIV>
</BODY>
```

FIG. 5B

SWAPPABLE CONTENT ITEMS

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for providing a content item. The method comprises: receiving a request for content to be published along with third party content in a resource; identifying a content item responsive to the request, the content item including a link to a landing page and an indicator for designating the content item as a swappable content item, wherein a swappable content item enables navigation away from the resource to the landing page associated with the content item without losing state of the resource, the content item further being configured to monitor interactions of the user and inhibit a direct loading of a landing page in favor of a simultaneous presentation of the content of the landing page in a container having an overlay that includes the resource; and providing the content item including the indicator responsive to the request.

In general, another aspect of the subject matter described in this specification can be implemented in methods that include a method for presenting content associated with a landing page. The method comprises: sending a content request to a serving system for a content item to be published along with third party content in a resource, the content item including a link to a landing page; receiving the content item and presenting the content item along with the third party content associated with the resource in a user interface; detecting an interaction with the content item, the interaction indicative of a user's intent to display content associated with the landing page; and preventing a direct linking to the landing page including: opening a container and linking to the landing page to enable presentation of content of the landing page in the container; and minimizing a frame associated with the resource including presenting a reduced size version of the frame as an overlay on the container, wherein state for the resource is maintained while enabling presentation of content associated with the landing page to the user In general, another aspect of the subject matter described in this specification can be implemented in computer program products. A computer program product tangibly embodied in a computer-readable storage device comprises instructions that, when executed by a processor, cause the processor to: receive a request for content to be published along with third party content in a resource; identify a content item responsive to the request, the content item including a link to a landing page and an indicator for designating the content item as a swappable content item, wherein a swappable content item enables navigation away from the resource to the landing page associated with the content item without losing state of the resource, the content item further being configured to monitor interactions of the user and inhibit a direct loading of a landing page in favor of a simultaneous presentation of the content of the landing page in a container having an overlay that includes the resource; and provide the content item including the indicator responsive to the request.

In general, another aspect of the subject matter described in this specification can be implemented in systems. A system comprises an application and a user interface. The application is configured to: send a content request to a serving system for a content item to be published along with third party content in a resource, the content item including a link to a landing page; receive the content item and present the content item along with the third party content associated with the resource in the user interface; detect an interaction with the content item, the interaction indicative of a user's intent to display content associated with the landing page; and prevent a direct linking to the landing page including: opening a container and linking to the landing page to enable presentation of content of the landing page in the container; and minimizing a frame associated with the resource including presenting a reduced size version of the frame as an overlay on the container, wherein state for the resource is maintained while enabling presentation of content associated with the landing page to the user.

These and other implementations can each optionally include one or more of the following features. The container can be an iFrame. The reduced size version can be a thumbnail. Minimizing can include transitioning from a whole viewport presentation of the frame to the reduced sized version of the frame over a predetermined time period while simultaneously enlarging the container to occupy substantially all of the viewport. Detecting the interaction can be detecting a click on the content item. The content item can be an advertisement and the resource can be a web page. An indication can be received from the user to transition back to the resource. The frame can be expanded to re-present the resource while the container is minimized. The expanding of the frame can occur while closing the container. Upon minimizing the frame, an address associated with the resource can be maintained as a current page for the purposes of a browser that is used to present a combination of the resource and the landing page. The resource can be loaded after minimizing the frame and upon receipt of a refresh command in the browser. Minimizing the frame associated with the resource can include deactivating a first set of styles associated with the frame and activating a second set of styles associated with the reduced size version of the frame. The activation and/or deactivation of styles can be accompanied by one or more transitions, transforms, animations, or other visual clues serving to train the user to associate the interaction with the minimizing of the frame.

Particular implementations may realize none, one or more of the following advantages. A user can interact with a resource to create a resource state, select a content item, navigate to a landing page associated with the content item, and return to the resource with the resource state being preserved. A user can speculatively browse an advertiser landing page while easily being able to return to a publisher page without losing state. A user can interact with a designator associated with a content item so that the user can select the content item without interruption of viewing of a publisher page.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5A illustrates example cascading style sheets (CSS) code.

FIG. 5B illustrates example HTML (HyperText Markup Language) code.

Like reference numbers and designations in the various drawings indicate like elements.

DETAILED DESCRIPTION

A content item can be received by a user device in response to a request for content and can be presented on a publisher page. The content item can include a navigation element for traversing to a content provider landing page referenced by the content item. The user may desire to view the content associated with the landing page but may be hesitant to select the content item due to not wanting to be interrupted with the viewing of the publisher page. For example, the user may not want to lose state associated with the publisher page, may wonder whether the publisher page may need to be reloaded after returning to the publisher page, and may wonder how easy it may be to return to the publisher page after viewing content associated with the landing page. In response to an interaction with the content item, the landing page content can be displayed, for example, in a container (e.g., an iFrame) while maintaining state of the publisher page. In some implementations a reduced-size version of the publisher page can be simultaneously displayed (e.g., as a thumbnail), which, when interacted with, can enable return to the publisher page.

Figure 1:
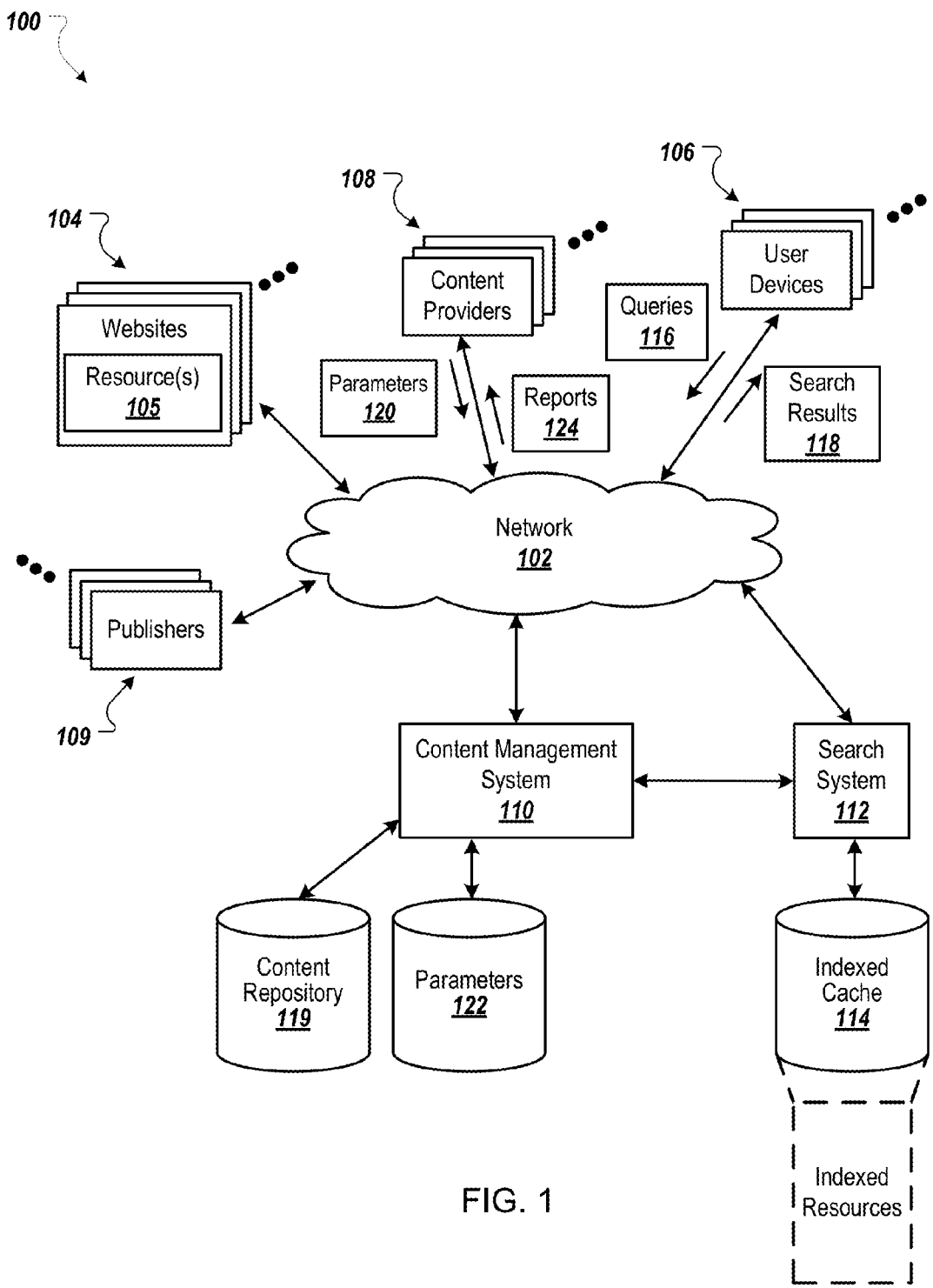
FIG. 1 is a block diagram of an example environment for providing content to a user.

FIG. 1 is a block diagram of an example environment 100 for providing content to a user. The example environment 100 includes a network 102 such as a local area network (LAN), wide area network (WAN), the Internet, or a combination thereof. The network 102 connects websites 104, user devices 106, content providers 108, publishers 109, and a content management system 110. The example environment 100 may include many thousands of websites 104, user devices 106, content providers 108, and publishers 109.

A website 104 includes one or more resources 105 associated with a domain name and hosted by one or more servers. An example website 104 is a collection of webpages formatted in hypertext markup language (HTML) that can contain text, images, multimedia content, and programming elements, e.g., scripts. Each website 104 is maintained by, for example, a publisher 109, e.g., an entity that controls, manages and/or owns the website 104.

A resource 105 is any data that can be provided over the network 102. A resource 105 is identified by a resource address that is associated with the resource 105. Resources 105 include HTML pages, word processing documents, and portable document format (PDF) documents, images, video, and feed sources, to name only a few examples. The resources 105 can include content, e.g., words, phrases, images and sounds that may include embedded information (such as meta-information in hyperlinks) and/or embedded instructions (such as JavaScript scripts).

To facilitate searching of resources 105, the environment 100 can include a search system 112 that identifies the resources 105 by crawling and indexing the resources 105 provided by the publishers 109 on the websites 104. Data about the resources 105 can be indexed based on the resource 105 to which the data corresponds. The indexed and, optionally, cached copies of the resources 105 can be stored in an indexed cache 114.

A user device 106 is an electronic device that is under control of a user and is capable of requesting and receiving resources 105 over the network 102. Example user devices 106 include personal computers, mobile communication devices, tablet devices, and other devices that can send and receive data over the network 102. A user device 106 typically includes a user application, such as a web browser, to facilitate the sending and receiving of data over the network 102 and the presentation of content to a user.

A user device 106 can request resources 105 from a website 104. In turn, data representing the resource 105 can be provided to the user device 106 for presentation by the user device 106. User devices 106 can also submit search queries 116 to the search system 112 over the network 102. In response to a search query 116, the search system 112 can access the indexed cache 114 to identify resources 105 that are relevant to the search query 116. The search system 112 identifies the resources 105 in the form of search results 118 and returns the search results 118 to the user devices 106 in search results pages. A search result 118 is data generated by the search system 112 that identifies a resource 105 that is responsive to a particular search query 116, and includes a link to the resource 105. An example search result 118 can include a web page title, a snippet of text or a portion of an image extracted from the web page, and the URL (Unified Resource Location) of the web page.

The data representing the resource 105 or the search results 118 can also include data specifying a portion of the resource 105 or search results 118 or a portion of a user display (e.g., a presentation location of a pop-up window or in a slot of a web page) in which other content (e.g., advertisements) can be presented. These specified portions of the resource or user display are referred to as slots or impressions. An example slot is an advertisement slot.

When a resource 105 or search results 118 are requested by a user device 106, the content management system 110 may receive a request for content to be provided with the resource 105 or search results 118. The request for content can include characteristics of one or more slots or impressions that are defined for the requested resource 105 or search results 118. For example, a reference (e.g., URL) to the resource 105 or search results 118 for which the slot is defined, a size of the slot, and/or media types that are available for presentation in the slot can be provided to the content management system 110. Similarly, keywords associated with a requested resource ("resource keywords") or a search query 116 for which search results 118 are requested can also be provided to the content management system 110 to facilitate identification of content that is relevant to the resource or search query 116. A request for a resource 105 or a search query 116 can also include an identifier, such as a cookie, identifying the requesting user device 106 (e.g., in instances in which the user consents in advance to the use of such an identifier).

Based, for example, on data included in the request for content, the content management system 110 can select content items that are eligible to be provided in response to the request, such as content items having characteristics matching the characteristics of a given slot. As another example, content items having selection keywords that match the resource keywords or the search query 116 may be selected as eligible content items by the content management system 110. Content items may be selected, for example from a content repository 119. One or more selected content items can be provided to the user device 106 in association with providing an associated resource 105 or search results 118. In some implementations, the content management system 110 can select content items based at least in part on results of an auction. For example, for the eligible content items, the content management system 110 can receive bids from content providers 108 and allocate the slots, based at least in part on the received bids (e.g., based on the highest bidders at the conclusion of the auction).

In some implementations, some content providers 108 prefer that the number of impressions allocated to their content and the price paid for the number of impressions be more predictable than the predictability provided by an auction. A content provider 108 can increase the likelihood that its content receives a desired or specified number of impressions, for example, by entering into an agreement with a publisher 109, where the agreement requires the publisher 109 to provide at least a threshold number of impressions (e.g., 1,000 impressions) for a particular content item provided by the content provider 108 over a specified period (e.g., one week). In turn, the content provider 108, publisher 109, or both parties can provide data to the content management system 110 that enables the content management system 110 to facilitate satisfaction of the agreement.

For example, the content provider 108 can upload a content item and authorize the content management system 110 to provide the content item in response to requests for content corresponding to the website 104 of the publisher 109. Similarly, the publisher 109 can provide the content management system 110 with data representing the specified time period as well as the threshold number of impressions that the publisher 109 has agreed to allocate to the content item over the specified time period. Over time, the content management system 110 can select content items based at least in part on a goal of allocating at least a minimum number of impressions to a content item in order to satisfy a delivery goal for the content item during a specified period of time.

A content provider 108 or content sponsor can create a content campaign associated with one or more content items using tools provided by the content management system 110. For example, the content management system 110 can provide one or more account management user interfaces for creating and managing content campaigns. The account management user interfaces can be made available to the content provider 108, for example, either through an online interface provided by the content management system 110 or as an account management software application installed and executed locally at a content provider's client device.

A content provider 108 can, using the account management user interfaces, provide campaign parameters 120 which define the content campaign. The content campaign can be created and activated for the content provider 108 according to the parameters 120 specified by the content provider 108. The campaign parameters 120 can be stored in a parameters data store 122. Campaign parameters 120 can include, for example, a campaign name, a preferred content network for placing content, a budget for the campaign, start and end dates for the campaign, a schedule for content placements, content (e.g., a creatives), and selection criteria. Selection criteria can include, for example, a language, one or more geographical locations or websites, and one or more selection terms. As another example, a content provider 108 can designate one or more content items as swappable content items.

A swappable content item enables navigation away from an originating resource (e.g., a publisher resource) to a landing page associated with the swappable content item without losing state of the originating resource. The swappable content item also enables easy navigation back to the publisher resource. The resource and the swappable content item can be configured, for example, so that when an interaction with (e.g., hover over, selection of) the swappable content item is detected, the swap can occur. The interaction can be indicative of a user's intent to display the landing page associated with the swappable content item.

A direct linking to the landing page can be prevented. For example, a container, such as an iFrame, can be opened and content of the landing page can be presented in the container. A frame associated with the resource can be minimized and, in some implementations, a reduced-size version (e.g., thumbnail) of the frame can be presented, such as an overlay on the container. The state of the resource can be maintained while the landing page content is presented. The user can interact with (e.g., select) the reduced-size version of the frame to cause the frame to expand or otherwise appear to re-present the originating resource. The container associated with the swappable item can be minimized or removed.

Swappable content items can be advantageous for users, publishers 209, and content providers 108. For example, a user may decide to select a swappable content item more readily than a non-swappable content item since the user may become aware, over time, that the user can easily return to a publisher resource after selecting a swappable content item. Swappable content items can encourage, for example, speculative browsing of content items. A publisher 109 may be willing to accept a lower cost from a content provider 108 for presentation of a swappable content item than for a non-swappable content item, since with a swappable content item there may be a higher probability that the user remains on or returns to a publisher resource after viewing landing page content associated with the swappable content item.

A content provider 108 may choose to configure a content item as a swappable content item because the content provider 108 may be interested, for example, in brand building and may be interested in all types of engagements with content items. Viewing landing page content by selecting a swappable content item can be less of a commitment for a user than a user performing a direct linking to a landing page. Brand advertisers, for example, may be interested in such user engagements that have lower commitment levels. The content management system 110 can provide one or more reports 124 to a content provider 108. The reports 124 can include, for example, campaign performance information and can also include information related to engagement of users with swappable content items.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Figure 2:
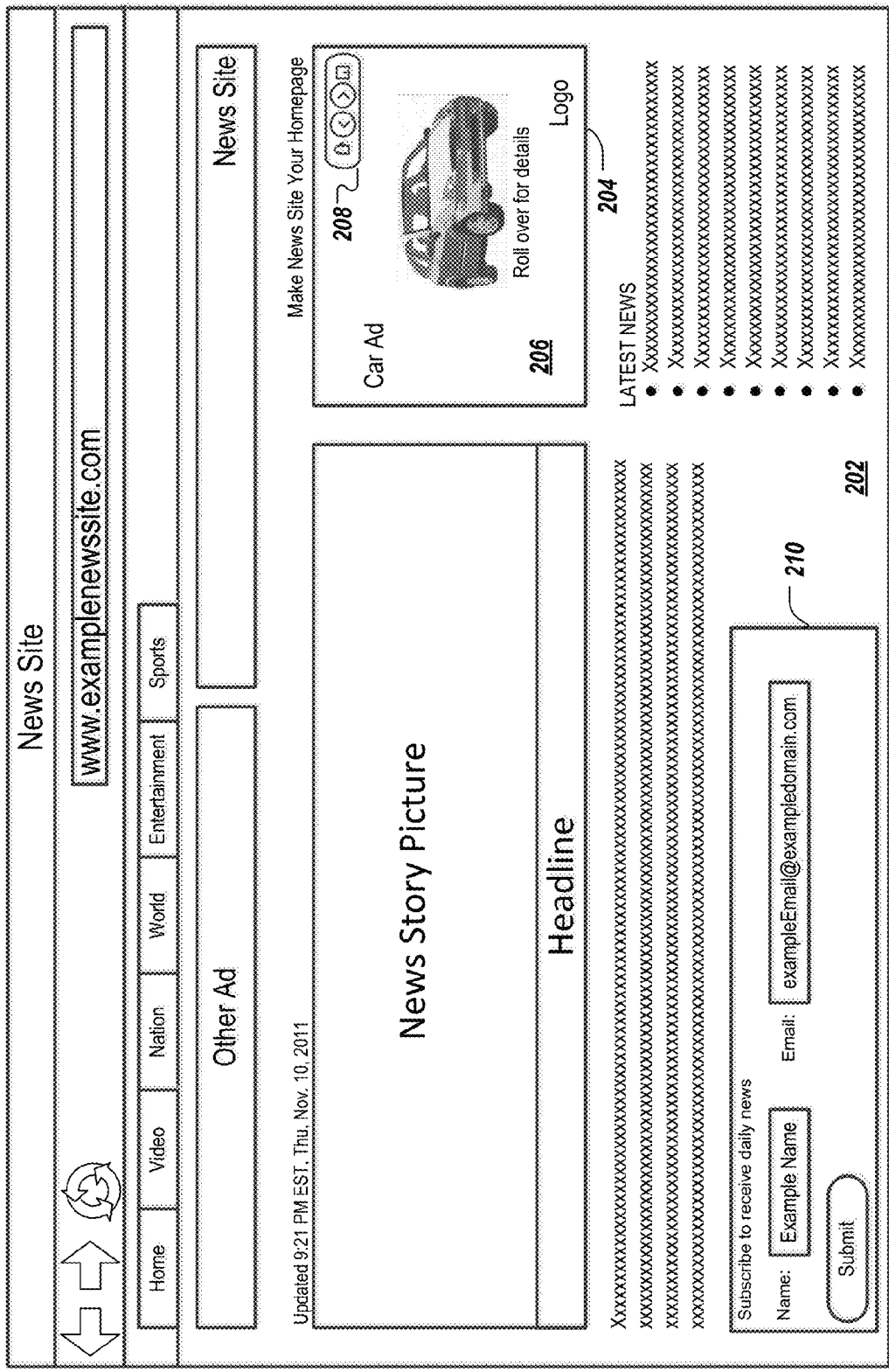
FIGS. 2 and 3 illustrate example browsers.

FIG. 2 illustrates an example browser 200. The browser 200 displays an example publisher web page 202 which includes a content slot 204. The browser 200 can, such as upon loading the publisher web page 202, request content from a content management system for the content slot 204. The content management system can identify and provide a content item 206 and the content item 206 can be presented in the content slot 204.

The content item 206 includes an indicator 208 which indicates that the content item 206 is a swappable content item. A swappable content item enables navigation away from the publisher web page 202 to a landing page associated with the content item 206 while maintaining state of the publisher web page 202. In response to an interaction (e.g., selection, hover-over) with the content item 206, landing page content associated with the content item 206 can be displayed in a container (e.g., an iFrame) and a reduced-size version of the publisher web page 202 can be displayed (e.g., as a thumbnail), which, if interacted with, can enable return to the publisher web page 202.

Maintaining state of the publisher page 202 can include, for example, maintaining state of a form 210. Other examples of maintaining state include maintaining state of an application running in the publisher web page 202, maintaining a page location (e.g., URL (Uniform Resource Locator)) setting in the browser 200, maintaining one or more cross-domain restrictions imposed by the browser 200 due to remaining on a domain associated with the publisher web page 202, maintaining state of client-side script (e.g., JavaScript) elements such as variables, objects, and functions, maintaining data related to events and timers, and maintaining open popup windows. Maintaining state can also include maintaining the appearance of the publisher web page 202 as last viewed by the user, which can include maintaining view customizations made by the user (e.g., maintaining the physical layout of the publisher web page 202, if changed from a load time configuration) and maintaining a browser scroll position. The scroll position can be important since the user may, upon returning to the publisher web page 202, recognize the scroll position to remember a last focus (e.g., the browser scroll position can be analogous to placing a finger on the line of a book while momentarily looking away from the page). In summary, if the user knows that the state of the publisher web page 202 will be maintained, the user may be more likely to be willing to navigate away from the publisher web page 202.

Figure 3:
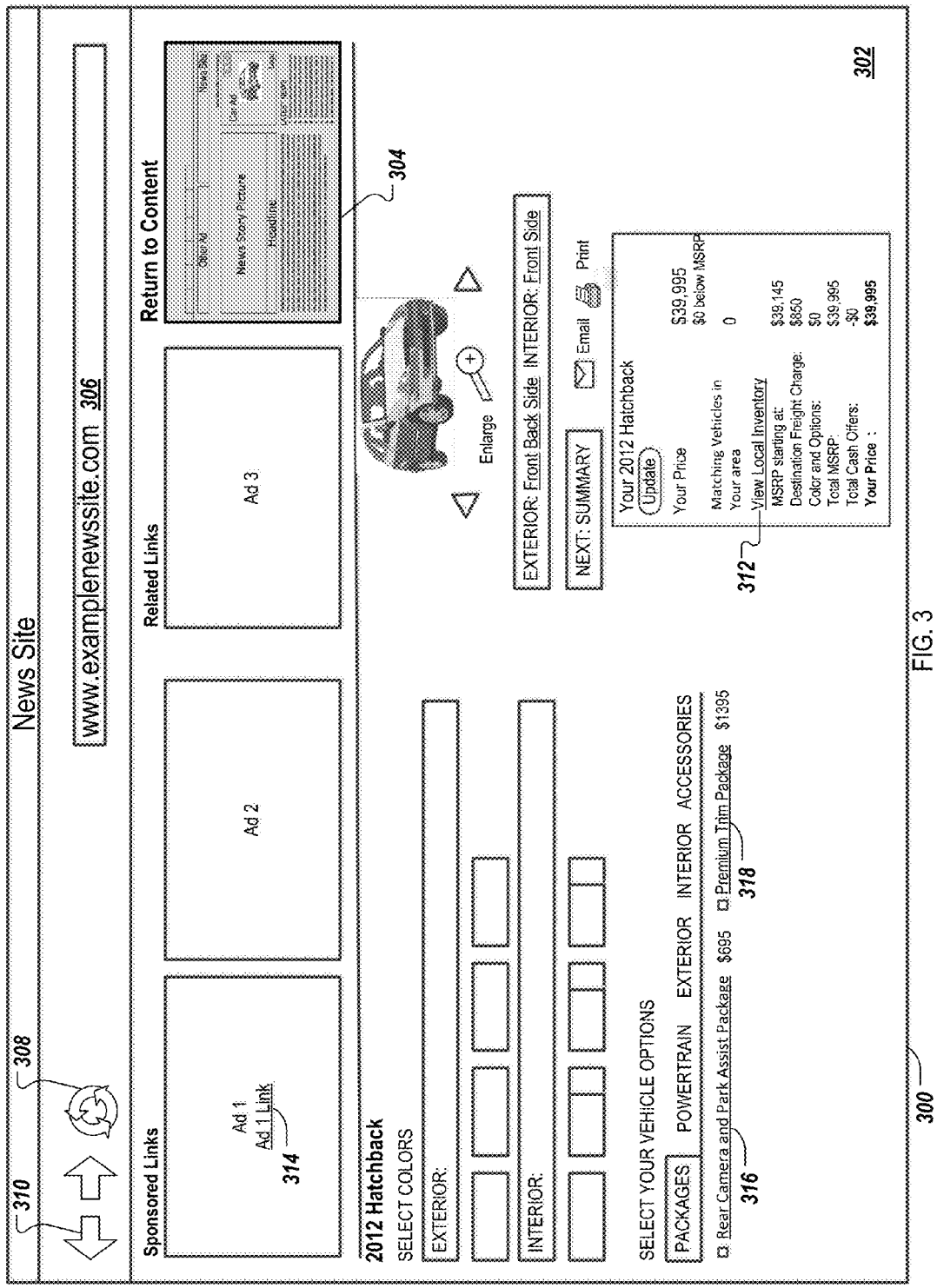

For example, FIG. 3 illustrates an example browser 300. The browser 300 displays a landing page 302 which includes a thumbnail 304. The thumbnail 304 is a reduced-size version of the publisher web page 202 which can be, for example, overlaid on top of the landing page 302. The landing page 302 is associated with the content item 206 described above. The transition from the presentation of the publisher web page 202 to the presentation of the landing page 302 can be animated. For example, the publisher web page 202 can appear to "shrink down" to the thumbnail 304 over time (e.g., over a span of, for example, a portion of a second, or one second). The landing page 302 can expand to a full size as the publisher web page 202 is being shrunk down to the thumbnail 304. Other animation techniques can be used.

If the user interacts with (e.g., selects) the thumbnail 304, the publisher web page 202 can be re-displayed (e.g., in the browser 300 or the browser 200) where state is maintained (e.g., the previous state is maintained). The re-display of the publisher web page 202 can be animated, such as including an animated expansion of the thumbnail 304 into a full-size version of the publisher web page 202 along with a shrinking of the landing page 302.

Over time, a user will learn how easily the transition between the publisher web page 202 and the landing page 302 can be. For example, the user can, over time, see the indicator 208 on multiple content items and can recognize that the indicator 208 indicates a swappable content item, such as after engaging in a "swap experience" with multiple content items. The animated transition between the publisher web page 202 and the landing page 302 after selection of the content item 206, and the animated transition from the landing page 302 to the publisher web page 202 after selection of the thumbnail 304 can also educate the user with respect to a swap experience. As users become familiar with the ability to swap between the landing page 302 and the publisher page 202, they may become more likely to interact with the content item 206, knowing that they can easily return to the publisher web page 202 if they are transitioned to the landing page 302.

In some implementations, an address bar 306 shows an address of the publisher web page 202, which can indicate to the user that the state of the publisher web page 202 is being maintained. In some implementations, if the user selects a refresh control 308, the publisher page 202 is reloaded and presented, for example as shown in FIG. 2. In some implementations, in response to selection of the refresh control 308, the landing page 302 is reloaded and the thumbnail 304 is either redisplayed or remains displayed. For example, a hash tag or other indicator can be added to the address displayed in the address bar 306, which can indicate that the user has initiated a swap experience and that a refresh action will refresh/reload that swap experience. The hash tag or other indicator can be detected, for example, by script code.

In some implementations, if the user selects a back control 310, the browser 300 displays the publisher web page 202. For example, although the address bar 306 displays the address of the publisher web page 202 and a previous web page may exist in the browser history prior to an entry for the publisher web page 202, upon display of the landing page 302, an additional, interstitial history item that is associated with the publisher web page 202 can be added to a history associated with the browser 300 so that selection of the back control 310 results in the referencing of that interstitial history item and the loading of the publisher web page 202. In some implementations, the interstitial history item is not added, and selection of the back control 310 results in the loading of a previous web page corresponding to an item that is previous in the browser 300's history to the publisher web page 202.

While viewing the landing page 302, the user can select a navigation element that is included in the landing page 302, such as a link 312. Upon selection of the link 312, the landing page 302 can be replaced with a new web page associated with the selected link. The thumbnail 304 can remain displayed, enabling the user to return to the publisher web page 202. In some implementations, the thumbnail 304 remains displayed when the user navigates to a new page from the landing page 302 if the new page is from a same domain as the landing page 302. If the new page is from a different domain than the domain of the landing page 302, the swap experience can end (e.g., the thumbnail 304 can be removed and the address bar 306 can display the address of the new page). For example, the swap experience can end if the user selects a link 314 which is associated with a different domain than the landing page 302. In some implementations, the swap experience can end if the user navigates to a predetermined number of web pages in addition to the landing page 302. For example, the predetermined number can be three, and if the user selects the link 312, a link 316, and a link 318, the swap experience can end after selection of the link 318. In some implementations, an exit control can be displayed (e.g., in association with the thumbnail 304) which, if selected, causes the swap experience to end.

In some implementations, if a swap experience has been ended (e.g., by the user or the system) or the user selects the back control 310, the browser 300 can load the publisher web page 202 (e.g., since the publisher web page 202 may be previous in the history of the browser 300). In some implementations, a hash tag or other indicator is added to the address displayed in the address bar 306 upon loading of the landing page 302 and/or an interstitial history item is added to the history of the browser 300, and selection of the back control 310 results in the redisplay of the landing page 302. In some implementations, such as in response to detection of a hash tag or another indicator, the swap experience can be re-established (e.g., including redisplay of the thumbnail 304) upon selection of the back control 310 after a user has exited out of the swap experience.

In some implementations, some actions related to a swap experience can be based on user preference information, so as for example when a user consents to a use of such information. For example, whether to go back to a publisher page, a landing page, a swap experience, etc. in response to selecting the back control 310 after exiting a swap experience can be based on user preferences. As another example, whether and when to exit out of a swap experience and whether to reload the publisher web page 202 or the landing page 302 or other page in response to selection of the refresh control 308 can be based on user preferences. Actions related to a swap experience can be decided based on user preferences associated with a particular user or with users in general. User preferences can be configured, for example, by a user on a per user basis. As another example, user preferences can be determined for a user based on a user's responses to prompts which may be displayed to the user for a predetermined number of times when an action option situation (e.g., reload publisher page or reload landing page) related to a swap experience occurs. In some implementations, responses to prompts by a subset of users having certain characteristics may determine future default actions for users having the same or similar characteristics. For example, if during a predetermined study period users under eighteen select at more than a threshold rate to reload a publisher page upon selecting a refresh control, a determination can be made to automatically reload a publisher page rather than a landing page upon selection of a refresh control for all users under eighteen.

In some implementations, a user can configure whether to, in general, be put into swap experiences. For example, if a user selects a user preference to not be put into swap experiences and if the content item 206 is selected for presentation in the content slot 204, the content item 206 can be presented without the indicator 208. In such an example, if the user selects the content item 206, the landing page 302 can be displayed without display of the thumbnail 304 (and upon loading the landing page 302, the address bar 306 can display the address of the landing page 302). The user can select the back control 310 to return to the publisher web page 302.

As another example, the indicator 208 can include an exit or close control which, if selected, can cause removal of the indicator 208 and can disable a swap ability of the content item 206. If the user removes the indicator 208 and subsequently selects the content item 206, the landing page 302 can be displayed without display of the thumbnail 304. In some implementations, the system can automatically detect that the user has removed the indicator 208 a predetermined number of times from presented content items and in response to such a determination can automatically disable the swap experience for the user (e.g., for subsequently presented content items). In such implementations, a user can re-enable an ability to engage in swap experiences with content items, such as by configuring a user preference.

Figure 4:
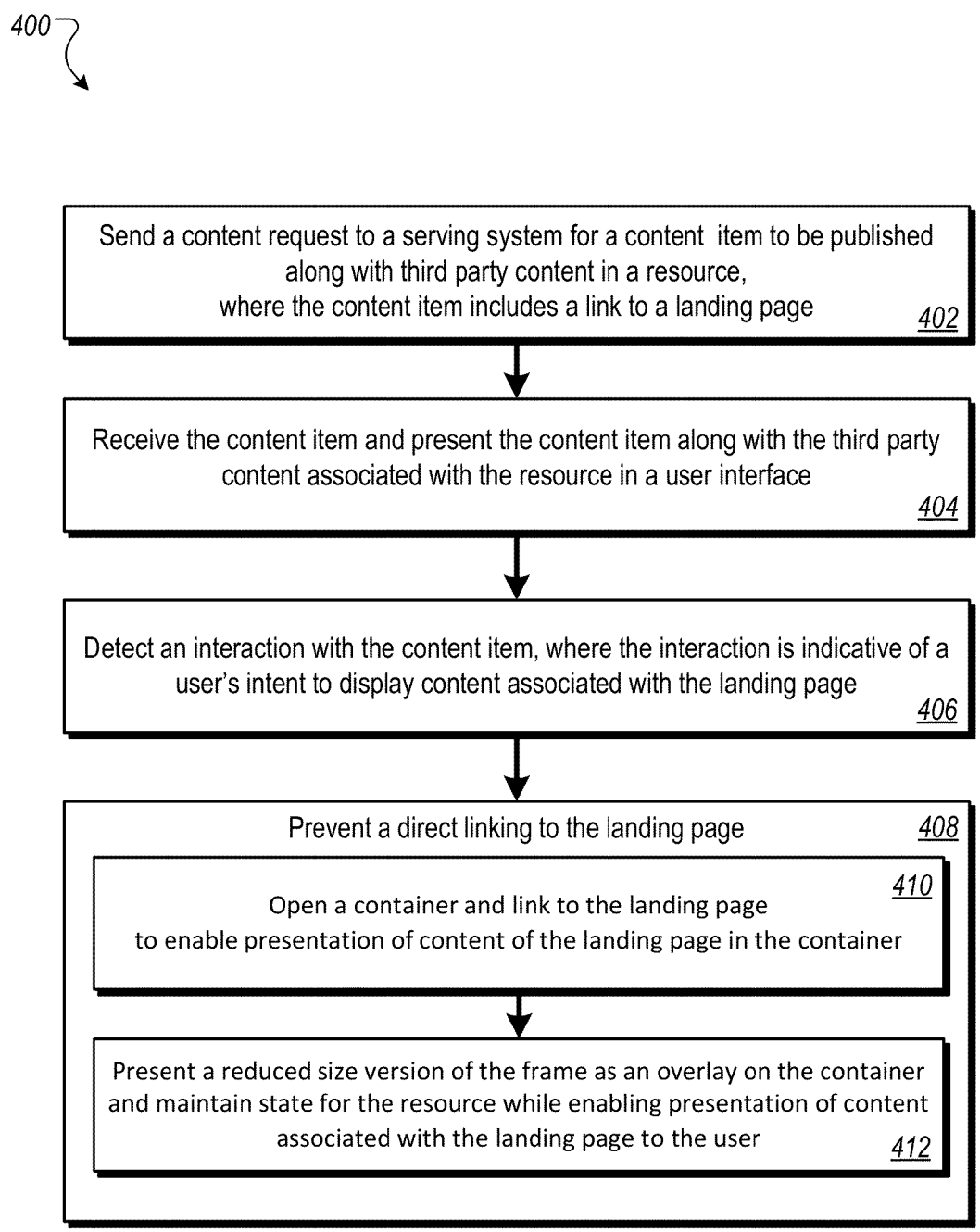
FIG. 4 is a flowchart of an example process for presenting content associated with a landing page.

FIG. 4 is a flowchart of an example process 400 for presenting content associated with a landing page. The process 400 can be performed, for example, by the user device 106 described above with respect to FIG. 1 and/or by the browser 300 described above with respect to FIG. 3.

A content request is provided (e.g., sent from a user or a publisher to a serving system) for a content item to be published along with third party content in a resource (402), wherein the content item includes a navigation element (e.g., link) to a landing page. The content item can be, for example, an advertisement. The content item can be identified and provided for presentation along with the third party content associated with the resource in a user interface (404). The content item can be presented, for example, in a content slot (e.g., an advertisement slot).

An interaction with the content item is detected (406), wherein the interaction is indicative of a user's intent to display content associated with the landing page. For example, the user can hover over the content item or select (e.g., click) the content item. As a more particular example, the user can select a link that is included in the content item. The interaction can be detected, for example, by a document layer that is positioned on top of the content item.

A direct linking to the landing page is prevented (408). For example, the document layer can intercept the interaction event which can result in the content item not receiving the interaction event. As another example and in further detail, to prevent direct linking, a container can be opened and linked to the landing page to enable presentation of content of the landing page in the container (410). The container can be, for example, an iFrame object.

A frame associated with the resource can be minimized. Minimizing the frame can include presenting a reduced-size version (e.g., a thumbnail) of the frame as an overlay on the container (412). State for the resource can be maintained while enabling presentation of content associated with the landing page to the user. Minimizing the frame can include transitioning from a whole viewport presentation of the frame to the reduced-sized version of the frame over a predetermined time period while simultaneously enlarging the container to occupy substantially all of the viewport.

Upon minimizing the frame, an address associated with the resource can be maintained as a current page for the purposes of a browser that is used to present a combination of the resource and the landing page. After a reduced-size version of the resource is presented, an indication can be received from the user to transition back to the resource, and the frame can be expanded to re-present the resource while minimizing the container. The frame can be expanded while closing the container. One or more transitions can be used to expand the frame and close the container. In some implementations, the transition(s) used to expand the frame and close the container can be faster than transition(s) used previously to minimize the frame (e.g., the user may be acclimated to the notions of swapping and de-swapping after initially selecting the swappable content item, so a faster transition can be used for unswapping than for swapping).

Minimizing the frame can include deactivating a first set of styles associated with the frame and activating a second set of styles associated with the reduced size version of the frame. The activation and/or deactivation of styles can be accompanied by one or more transitions, transforms, animations, or other visual clues serving to train the user to associate the interaction with the minimizing of the frame. In some implementations, the styles can define actions that include the moving of the content item, the expansion of the content item, making the content item transparent, and making the landing page less transparent, which collectively can create a visual effect which causes the content item to appear to dissolve and to be replaced with the landing page. Content associated with the landing page can be loaded while such actions are being performed, to reduce or eliminate a delay for the user of the loading of such content.

The styles mentioned above can be implemented, for example, using CSS. For example, FIG. 5A illustrates example CSS code 500. The CSS code 500 includes a style definition 502 associated with a full-size version of the resource, a style definition 504 associated with the resource when the resource is minimized, a style definition 506 associated with the landing page when the landing page is displayed, a style definition 508 associated with the landing page when the landing page is hidden (e.g., if the user returns to the resource and/or before the user selects the content item), a style definition 510 associated with the reduced-size version of the resource when the reduced-size version is hidden, and a style definition 512 associated with the reduced-size version when the reduced-size version is displayed. Style definitions defined in the CSS code 500 can be referenced in example HTML code 550 that is associated with the resource (e.g., as illustrated in FIG. 5B). For example, a class name 552 refers to the style definition 506 and a class name 554 refers to the style definition 502.

Figure 6:
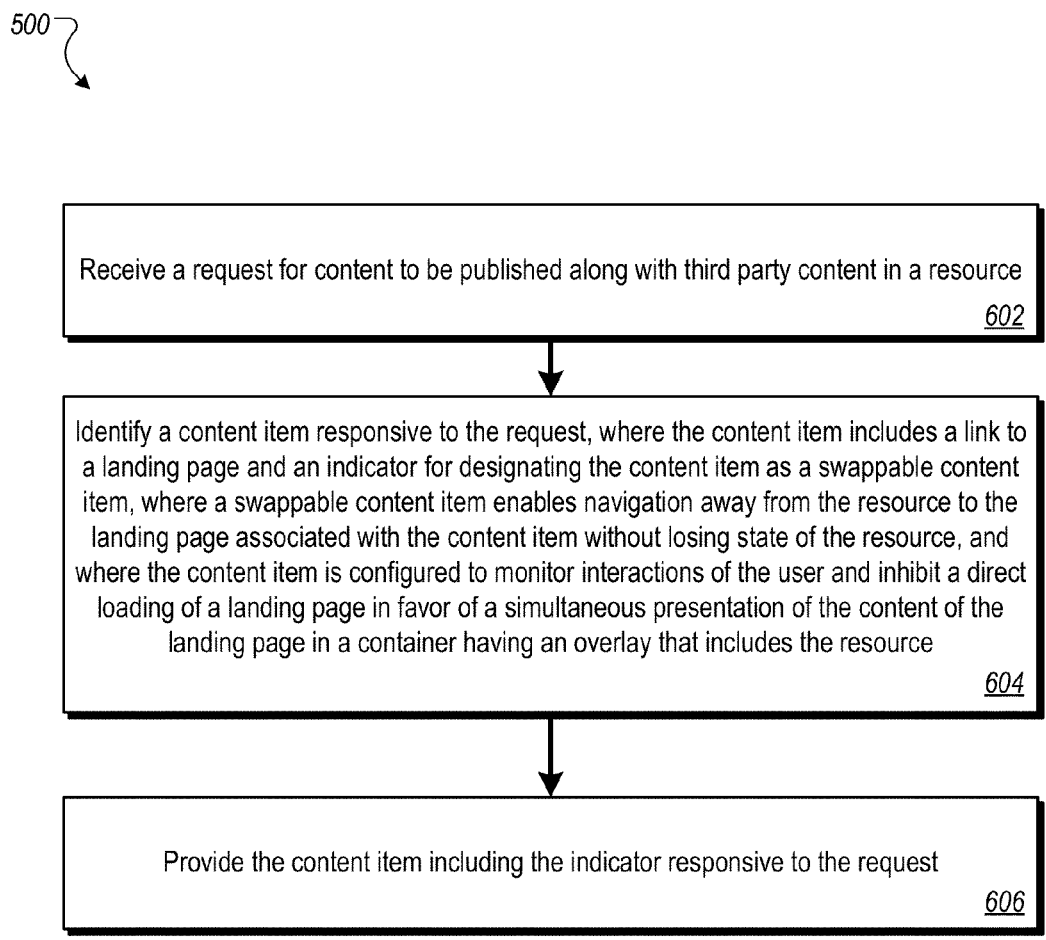
FIG. 6 is a flowchart of an example process for providing a content item.

FIG. 6 is a flowchart of an example process 600 for providing a content item. The process 600 can be performed, for example, by the content management system 110 described above with respect to FIG. 1.

A request is received for content to be published along with third party content in a resource (602). For example, a request can be received by the content management system 110 for one or more content items for one or more content slots.

A content item is identified responsive to the request (604). The content item can be, for example, an advertisement. The content item includes a link to a landing page and an indicator for designating the content item as a swappable content item. A swappable content item enables navigation away from the resource to the landing page associated with the content item without losing state of the resource.

The content item including the indicator is provided responsive to the request (606). The content item is configured to monitor interactions of the user and inhibit a direct loading of a landing page in favor of a simultaneous presentation of the content of the landing page in a container having an overlay that includes the resource.

Figure 7:
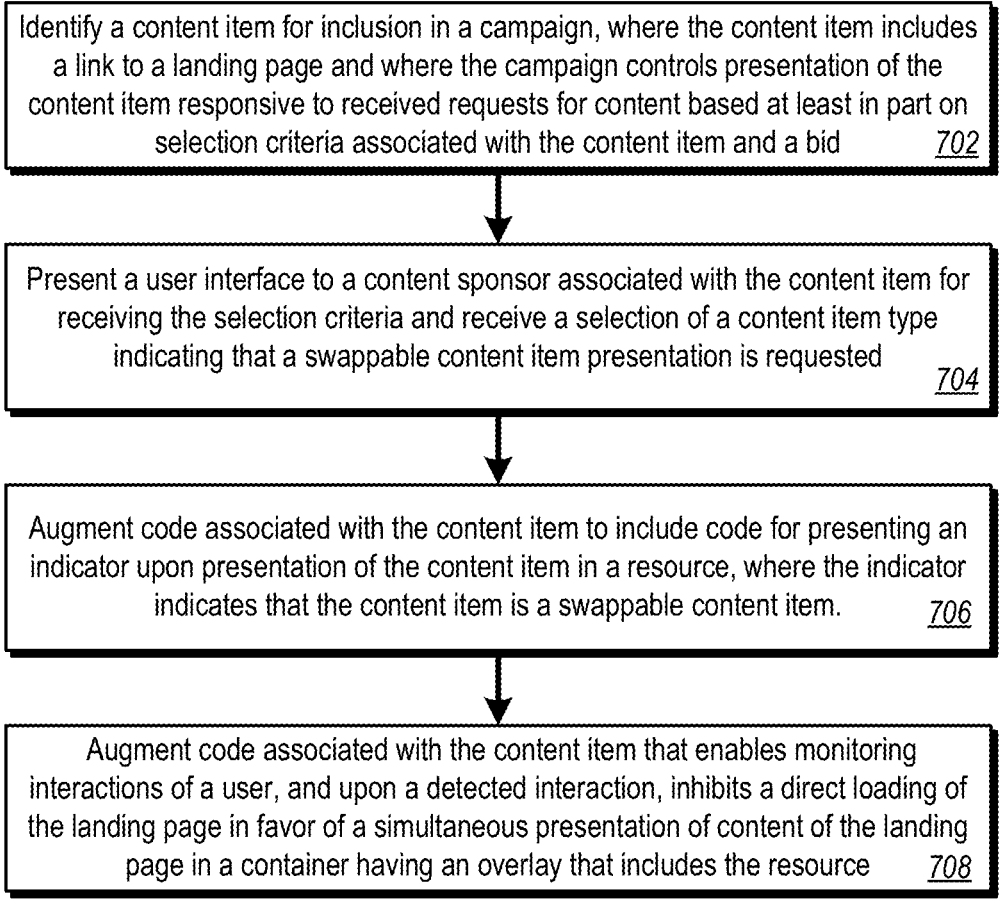
FIG. 7 is a flowchart of an example process for configuring a content item.

FIG. 7 is a flowchart of an example process 700 for configuring a content item. The process 700 can be performed, for example, by the content management system 110 described above with respect to FIG. 1.

A content item is identified for inclusion in a campaign (702). The content item can be, for example, an advertisement. The content item includes a navigation element (e.g., a link) to a landing page and the campaign controls presentation of the content item responsive to received requests for content based at least in part on selection criteria associated with the content item and a bid.

A user interface is presented to a content sponsor associated with the content item for receiving the selection criteria (704). A selection of a content item type is received that indicates a swappable content item presentation is requested.

Figure 8:
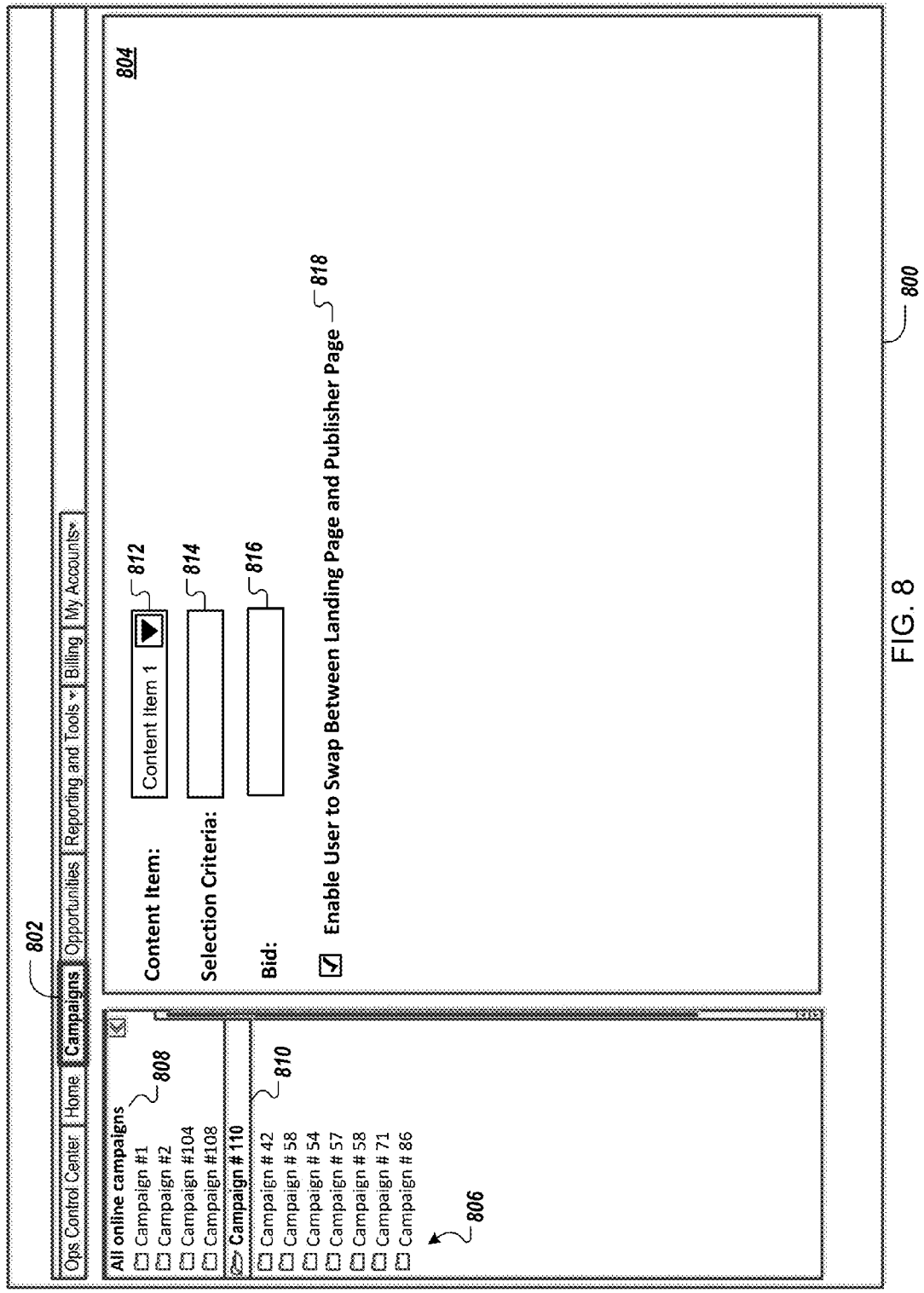
FIG. 8 illustrates an example campaign management user interface.

For example, FIG. 8 illustrates an example campaign management user interface 800. The user interface 800 can be included, for example, in one or more user interfaces that a user, such as a campaign sponsor, can use to configure a campaign. The sponsor can select a tab 802 to display a campaign configuration area 804. The sponsor can view a list 806 of campaigns by selecting a control 808. The sponsor can edit an existing campaign in the campaign configuration area 804 by selecting the name of an existing campaign (e.g., a name 810) in the campaign list 806.

The sponsor can select a content item for the campaign using a control 812. Selection criteria and a bid for the selected content item can be specified using controls 814 and 816, respectively. The sponsor can select a control 818 to indicate that a swappable content item presentation is requested for the selected content item.

Referring again to FIG. 7, code associated with the content item is augmented to include code for presenting an indicator upon presentation of the content item in a resource that the content item is a swappable content item (706). For example, the code can be augmented to include code for presenting an indicator such as the indicator 208 described above with respect to FIG. 2.

Code associated with the content item is augmented that enables monitoring interactions of a user, and upon a detected interaction inhibits a direct loading of the landing page in favor of a simultaneous presentation of content of the landing page in a container having an overlay that includes the resource (708).

Figure 9:
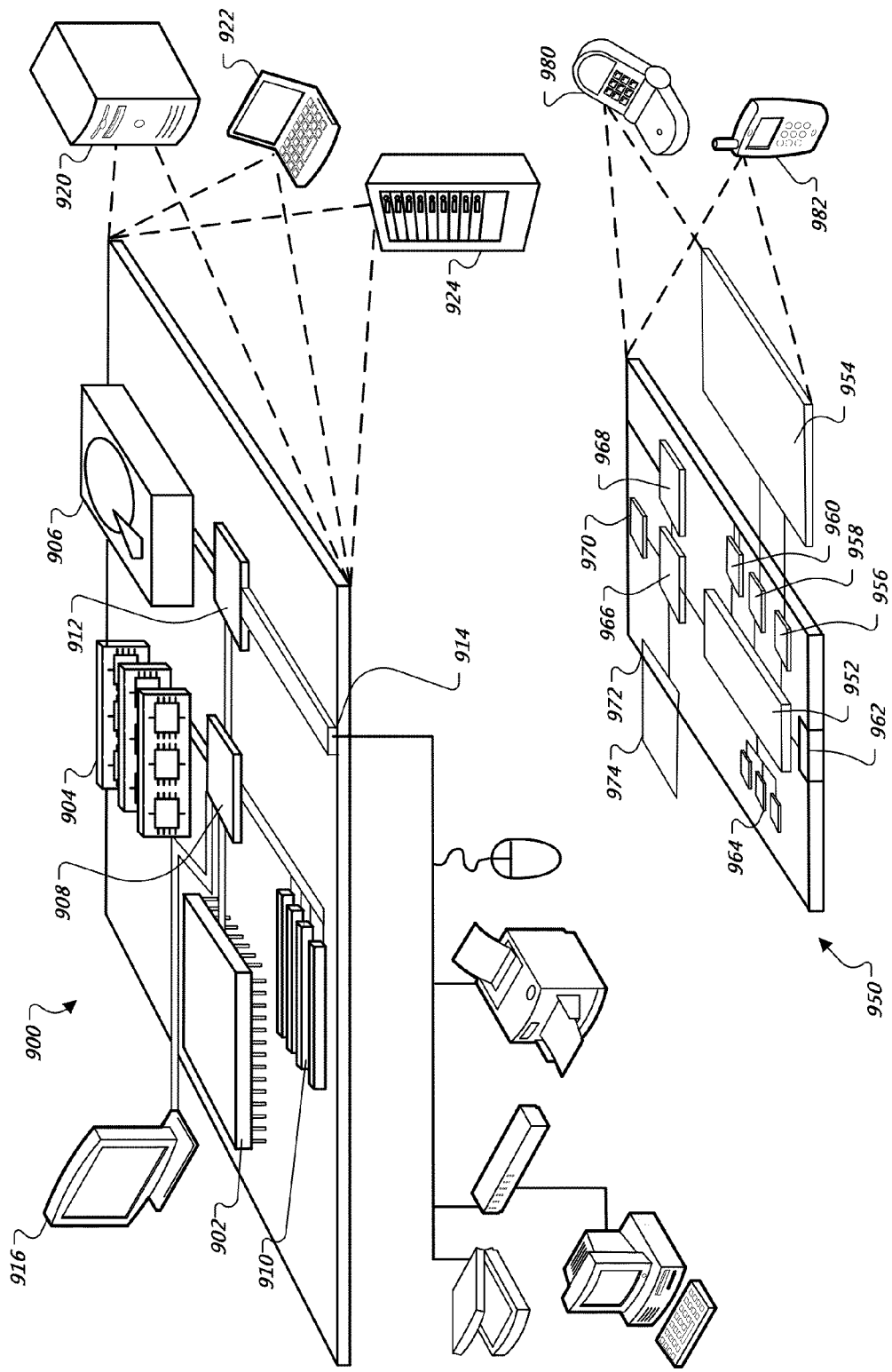
FIG. 9 is a block diagram of computing devices that may be used to implement the systems and methods described in this document, as either a client or as a server or plurality of servers.

FIG. 9 is a block diagram of computing devices 900, 950 that may be used to implement the systems and methods described in this document, as either a client or as a server or plurality of servers. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a computer-readable medium. The computer-readable medium is not a propagating signal. In one implementation, the memory 904 is a volatile memory unit or units. In another implementation, the memory 904 is a non-volatile memory unit or units.

The storage device 906 is capable of providing mass storage for the computing device 900. In one implementation, the storage device 906 is a computer-readable medium. In various different implementations, the storage device 906 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of duties is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can process instructions for execution within the computing device 950, including instructions stored in the memory 964. The processor may also include separate analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD display or an OLED display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication (e.g., via a docking procedure) or for wireless communication (e.g., via Bluetooth or other such technologies).

The memory 964 stores information within the computing device 950. In one implementation, the memory 964 is a computer-readable medium. In one implementation, the memory 964 is a volatile memory unit or units. In another implementation, the memory 964 is a non-volatile memory unit or units. Expansion memory 974 may also be provided and connected to device 950 through expansion interface 972, which may include, for example, a SIMM card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS receiver module 970 may provide additional wireless data to device 950, which may be used as appropriate by applications running on device 950.

Device 950 may also communication audibly using audio codec 960, which may receive spoken information from a user and convert it to usable digital information. Audio codex 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising:
   receiving a request for third party content to be presented along with content of a web page;
   identifying an advertisement responsive to the request, the advertisement including a link to a landing page and an indicator for designating the advertisement as a swappable advertisement, wherein a swappable advertisement enables navigation away from the web page to the landing page associated with the advertisement by causing a browser on a client device to:
      present, for display, the content of the landing page within a container of the web page responsive to detecting an interaction with the advertisement, the content of the web page and the advertisement initially displayed in a frame of the web page at a first size;
      minimize the frame in which content of the web page is presented;
      present a reduced size presentation of the web page including the advertisement and displayed within the frame at a second size along with the content of the landing page displayed within the container; and
      responsive to receiving an action on an actionable item corresponding to the reduced size presentation of the web page, re-present the frame including the content of the web page at the first size; and
   providing the advertisement including the indicator responsive to the request.

2. A method comprising:
   sending a content request to a serving system for a advertisement to be presented along with content of a web page, the advertisement including a link to a landing page, the serving system different than a web server providing the web page;
   receiving the advertisement from the serving system;
   presenting the advertisement along with the content of the web page in a frame of the web page, the frame of the web page presented at a first size;
   detecting an interaction with the advertisement to display content of the landing page;
   presenting, for display, the content of the landing page within a container of the web page;
   minimizing the frame in which content of the web page is presented;
   presenting a reduced size presentation of the web page including the advertisement and displayed within the frame at a second size along with the content of the landing page displayed within the container; and responsive to receiving an action on an actionable item corresponding to the reduced size presentation of the web page, re-presenting the frame including the content of the web page at the first size.

3. The method of claim 2 wherein the container is an iFrame.

4. The method of claim 2 wherein the reduced size presentation is a thumbnail.

5. The method of claim 2 wherein minimizing includes transitioning from a whole viewport presentation of the frame to the reduced size presentation over a predetermined time period while simultaneously enlarging the container to occupy substantially all of the viewport.

6. The method of claim 2 wherein detecting the interaction is detecting a click on the advertisement.

7. The method of claim 2, wherein re-presenting the frame includes expanding the frame to re-present the web page while minimizing the container.

8. The method of claim 7 wherein expanding the frame occurs while closing the container.

9. The method of claim 2 wherein, upon minimizing the frame, maintaining an address associated with the web page as a current page for the purposes of a browser that is used to present a combination of the web page and the landing page.

10. The method of claim 2 wherein, after minimizing the frame, and upon receipt of a refresh command in a browser, reloading the web page.

11. The method of claim 2 wherein minimizing the frame associated with the web page includes deactivating a first set of styles associated with the frame and activating a second set of styles associated with the reduced size presentation.

12. The method of claim 11 wherein the activation and/or deactivation of styles is accompanied by one or more transitions, transforms, animations, or other visual clues serving to train the user to associate the interaction with the minimizing of the frame.

13. A method comprising:
identifying an advertisement for inclusion in a campaign, the advertisement including a link to a landing page, wherein the campaign controls presentation of the advertisement responsive to received requests for content based at least in part on selection criteria associated with the advertisement and a bid;
presenting a user interface to a content sponsor associated with the advertisement for receiving the selection criteria including receiving a selection of a advertisement type indicating a swappable advertisement presentation is requested; and
augmenting code associated with the advertisement to include code for presenting an indicator upon presentation of the advertisement in a web page that the advertisement is a swappable advertisement and code that:
detecting an interaction with the advertisement to display content of the landing page, the advertisement initially displayed with content of a web page in a frame of the web page at a first size;
presenting, for display, the content of the landing page within a container of the web page responsive to detecting the interaction with the advertisement;
minimizing the frame in which content of the web page is presented;
presenting a reduced size presentation of the web page including the advertisement and displayed within the frame at a second size along with the content of the landing page displayed within the container; and
responsive to receiving an action on an actionable item corresponding to the reduced size presentation of the web page, re-presenting the frame including the content of the web page at the first size.

14. A non-transitory computer program product tangibly embodied in a non-transitory computer-readable storage device and comprising instructions that, when executed by a processor, cause the processor to:
receive a request for third party content to be published along with content of a web page;
identify an advertisement responsive to the request, the advertisement including a link to a landing page and an indicator for designating the advertisement as a swappable advertisement, wherein a swappable advertisement enables navigation away from the web page to the landing page associated with the advertisement by causing a browser on a client device to:
present, for display, the content of the landing page within a container of the web page responsive to detecting an interaction with the advertisement, the content of the web page and the advertisement initially displayed in a frame of the web page at a first size;
minimize the frame in which content of the web page is presented;
present a reduced size presentation of the web page including the advertisement and displayed within the frame at a second size along with the content of the landing page displayed within the container; and
responsive to receiving an action on an actionable item corresponding to the reduced size presentation of the web page, re-presenting the frame including the content of the web page at the first size; and
provide the advertisement including the indicator responsive to the request.

15. The product of claim 14 wherein the container is an iFrame.

16. The product of claim 14 wherein the reduced size presentation is a thumbnail.

17. The product of claim 14 wherein minimizing includes transitioning from a whole viewport presentation of the frame to the reduced size presentation over a predetermined time period while simultaneously enlarging the container to occupy substantially all of the viewport.

18. The product of claim 14 wherein detecting the interaction is detecting a click on the advertisement.

19. The product of claim 14, wherein re-presenting the frame includes expanding the frame to re-present the web page while minimizing the container.

20. The product of claim 19 wherein expanding the frame occurs while closing the container.

21. The product of claim 14 wherein, upon minimizing the frame, maintaining an address associated with the web page as a current page for the purposes of a browser that is used to present a combination of the web page and the landing page.

22. The product of claim 14 wherein, after minimizing the frame, and upon receipt of a refresh command in a browser, reloading the web page.

23. The product of claim 14 wherein minimizing the frame associated with the web page includes deactivating a first set of styles associated with the frame and activating a second set of styles associated with the reduced size presentation.

24. The product of claim 23 wherein the activation and/or deactivation of styles is accompanied by one or more transitions, transforms, animations, or other visual clues serving to train the user to associate the interaction with the minimizing of the frame.

25. A system comprising:
a processor; and
a memory storing computer instructions;
wherein the computer instructions, when executed by the processor, cause the system-to:
- send a content request to a serving system for an advertisement to be presented along with content of a web page, the advertisement including a link to a landing page, the serving system different than a web server providing the web page;
- receive the advertisement from the serving system;
- present the advertisement along with the content of the web page in a frame of the web page, the frame of the web page presented at a first size within the user interface;
- detect an interaction with the advertisement to display content associated with the landing page;
- present, for display, the content of the landing page within a container of the web page;
- minimize the frame in which content of the web page is presented;
- present a reduced size presentation of the web page including the advertisement and displayed within the frame at a second size along with the content of the landing page displayed within the container; and
- responsive to receiving an action on an actionable item corresponding to the reduced size presentation of the web page, re-present the frame including the content of the web page at the first size.

26. The system of claim 25 wherein the container is an iFrame.

27. The system of claim 25 wherein the reduced size presentation is a thumbnail.

28. The system of claim 25 wherein minimizing includes transitioning from a whole viewport presentation of the frame to the reduced sized presentation over a predetermined time period while simultaneously enlarging the container to occupy substantially all of the viewport.

29. The system of claim 25 wherein detecting the interaction is detecting a click on the advertisement.

30. The system of claim 25, wherein re-presenting the frame includes expanding the frame to re-present the web page while minimizing the container.

31. The system of claim 30 wherein expanding the frame occurs while closing the container.

32. The system of claim 25 wherein, upon minimizing the frame, maintaining an address associated with the web page as a current page for the purposes of a browser that is used to present a combination of the web page and the landing page.

* * * * *